United States Patent
Martin

[15] 3,683,274
[45] Aug. 8, 1972

[54] LUMPED COMPONENT STANDING WAVE RATIO INDICATORS FOR RADIO FREQUENCY TRANSMISSION LINES

[72] Inventor: Peter G. Martin, Oak Cottage, Witton Gilbert, England

[22] Filed: June 4, 1970

[21] Appl. No.: 43,452

[52] U.S. Cl. .................324/58 R, 324/95, 250/39 R
[51] Int. Cl. ............................................G01r 27/04
[58] Field of Search ..324/58, 95, 132, 140; 328/145; 250/39 R

[56] References Cited

UNITED STATES PATENTS

| | | | |
|---|---|---|---|
| 2,925,556 | 2/1960 | Schimmel | 324/95 |
| 3,255,417 | 6/1966 | Gottlieb | 324/140 |
| 3,363,177 | 1/1968 | Houghton | 324/123 |

OTHER PUBLICATIONS

Golahny, Y. " Silicon Diodes as Logarithmic Elements" Ratheon Semiconductor Engineering File, No. 129- D, Oct. 1957, 7 pp.
Ives, R. L. " Direct Recording of Wind Slip" in J. F. I. Sept. 1960, pp. 170- 171.

Primary Examiner—Rudolph V. Rolinec
Assistant Examiner—R. J. Corcoran
Attorney—Larson, Taylor & Hinds

[57] ABSTRACT

An instrument which gives direct readings of the standing wave ratio on a radio frequency transmission line by deriving direct current voltages which are proportional to the forward and reflected voltages and then using these voltages to generate further voltages which are dependent on the logarithm of the forward and reflected voltages. By direct comparison of these latter voltages a direct reading of the standing wave ratio is obtained.

4 Claims, 3 Drawing Figures

LUMPED COMPONENT STANDING WAVE RATIO INDICATORS FOR RADIO FREQUENCY TRANSMISSION LINES

BACKGROUND OF THE INVENTION

The present invention relates to an instrument giving readings of the standing wave ratio on a radio frequency transmission line.

The frequency dependence problem associated with conventional reflectometers precludes their use for accurate power measurement. This arises because the transmission line voltage is sampled by a voltage divider consisting of a fixed resistance and the distributed capacitance of a length of transmission line, and because the line current is detected by a radio frequency transformer consisting of a small wire loop inductively coupled to the line. In the first case the capacitive reactance varies with frequency and affects the divider ratio. In the second instance the voltage induced across the loop is proportional to the rate of change of magnetic flux around it, and therefore increases with frequency.

Both these basic failures can be corrected by the use of conventional lumped components instead of the distributed parameters of transmission lines. In particular the voltage detector should consist of two resistors or two capacitors rather than a resistor and a capacitor, and the current detector should be a toroidal current transformer.

A basic requirement of standing wave ratio (swr) bridges or directional watt-meters is to generate two voltages proportional to the forward and reflected voltages or currents of the transmission line. To achieve this one has either the current detector or the voltage detector providing two anti-phase signals so that addition and subtraction can be performed.

A wattmeter has already been designed using the above principles which necessitates the use of two meters.

SUMMARY OF THE INVENTION

According to the present invention there is provided a device for measuring the standing wave ratio on a radio frequency transmission line including means for deriving direct current voltages proportional to the forward and reflected voltages, means for generating, from these voltages, further voltages which are dependent on the logarithm of the forward and reflected voltages and means for comparing these logarithmic voltages so as to obtain the standing wave ratio.

Preferably the means for generating from the direct current voltages further voltages which are dependent on the logarithm of the forward and reflected voltages includes two diodes.

Preferably the means for comparing the logarithmic voltages so as to obtain the standing wave ratio includes a meter in series with a pre-set variable resistor.

In a modified form the means for comparing the logarithmic voltages so as to obtain the standing wave ratio includes a differential amplifier connected to a meter.

BRIEF DESCRIPTION OF DRAWING

The present invention will now be described in greater detail by way of examples with reference to the accompanying drawing, wherein.

DESCRIPTION OF THE PREFERRED EMBODIMENTS

Figure 1:
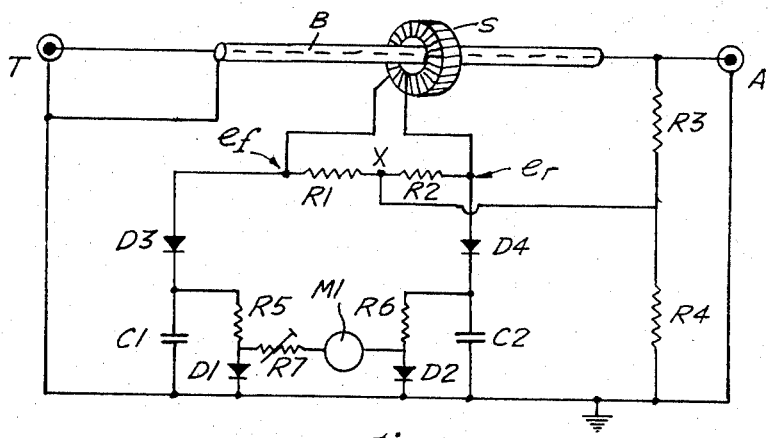
FIG. 1 is a circuit diagram of the device set up for operation on a transmission line.

Referring to FIG. 1 a toroidal current transformer S is arranged around a transmission line TA. The outer conductor of a short length of coaxial cable B acts as an electrostatic screen between the transmission line TA and the transformer S. The secondary winding of the transformer S consists of a few turns of wire wound toroidally (for example 12). The low resistance in the secondary circuit of the transformer S is split into two equal parts each comprising a resistance R1 or R2 arranged in parallel with a circuit arrangement containing diodes D1, D3 a resistor R5 and a capacitor C1 or diodes D2, D4 a resistor R6 and a capacitor C2 respectively. The center connection X of the resistive chain R1–R2 is taken to a point between two resistors R3 and R4 which are connected in series between the transmission line and earth. The resistors R1 and R2 have equal values of resistance while the diodes D1 and D2 are preferably matched as are the diodes D3 and D4. A meter M1 in series with a pre-set variable resistor R7 is connected between the two equal parts of the secondary circuit of the transformer S as shown, that is on the one hand to the junction between R5 and D1 and on the other hand to the junction between R6 and D2.

Figure 2:
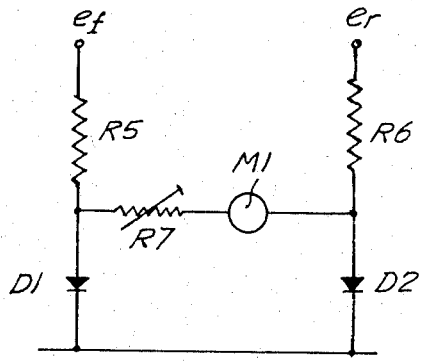
FIG. 2 shows part of the circuit shown in FIG. 1 in greater detail.

Referring to FIG. 2 the forward and reflected voltages $E_f$ and $E_r$ respectively which are detected using the transformer S are obtained as voltages $e_f$ and $e_r$ which are proportional to $E_f$ and $E_r$ respectively at the points shown. The series arrangements of resistor R5 and diode D1 and R6 and D2 act as voltage dividers giving two voltages in opposition across the meter M1 so that the meter will read the resultant thereof. These voltages are the logarithms of the voltages $e_f$ and $e_r$ due to the fact that the voltage across the diode D1 or D2 is logarithmically dependent on the current through the diodes. This current is directly proportional to the voltage $e_f$ or $e_r$ which produces a current in the resistor R5 or R6 respectively.

Hence in effect the reading on the meter M1 is directly proportional to $\log E_f - \log E_r = \log E_f / E_r$. Now $E_f / E_r = (SWR+1) / (SWR-1)$ where SWR is the standing wave ratio on the transmission line. Hence the reading on the meter M1 is directly proportional to log $(SWR+1) / (SWR-1)$ and so the meter can be calibrated in units of standing wave ratio.

The means for comparing the two logarithmic voltages can be other than a resistor-meter series arrangement. In an alternative form the resistor R7 is omitted giving a cruder device.

Figure 3:
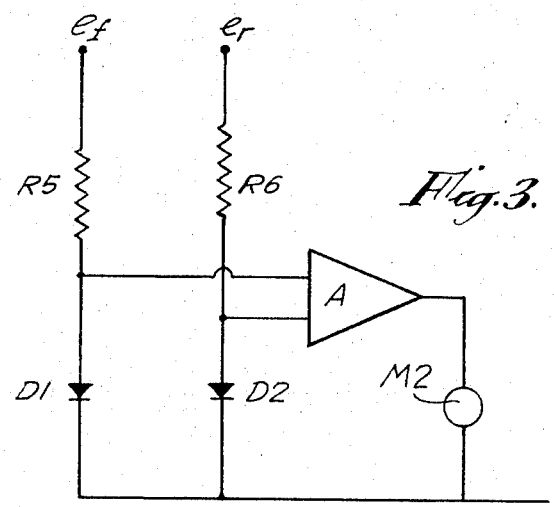
FIG. 3 is a circuit diagram of a modified form of part of the device.

Referring to FIG. 3 the resistor-meter series arrangement is replaced by a differential amplifier A connected to a meter M2. This reduces errors which occur when the standing wave ratio approaches 1:1.

The diodes D1 and D2 are preferably of the semiconductor p-n junction type. It has been found that many semi-conductor p-n types have the required logarithmic properties, but some are better than others. In addition there are other types of diode which have the required logarithmic properties, but which do not contain pqn junctions of semi-conductor materials. An example is the Hot Carrier or Schottky Barrier diode, which uses a metal semi-conductor junction.

One of the advantages of the above device is that the calibration of the meter is substantially independent of both the power and frequency of the energy being propagated in the transmission line.

Also when the one-meter type of device as described above is used the standing wave ratio can be read directly from the meter.

The simplicity of this device and hence the small space it requires allows it to be readily incorporated in larger pieces of apparatus such as a transmitter or transceiver.

What I claim and desire to secure by Letters Patent is:

1. Apparatus for measuring the standing wave ratio on a radio frequency transmission line, including a toroidal current transformer arranged around the transmission line and having a toroidally wound secondary wire thereon; an electrostatic screen positioned between the line and the current transformer; a first voltage dividing chain composed of first and second serially connected impedances connected across the secondary wire of the current transformer; a second voltage dividing chain composed of third and fourth serially connected impedances connected between the transmission line and ground; a conductive connection for interconnecting the junctions between the first and second impedances and the third and fourth impedances such that voltages proportional to the forward and reflected voltages on the transmission line are obtained at either end of the first voltage dividing chain; a pair of identical circuit arms each comprising a resistor and a diode connected in series across a capacitor to form a parallel circuit therewith, and a further diode connected in series with said parallel circuit, each one of said pair of identical circuit arms being connected between respective ends of the said first voltage dividing chain and ground for deriving further voltages from the first voltages which are dependent upon the logarithms of the derived forward and reflected voltages; and a voltage comparator means for automatically comparing said further voltages and producing a measurement of the standing wave ratio on the transmission line in accordance therewith.

2. Apparatus according to claim 1, wherein said voltage comparator means comprise a voltmeter and preset variable resistor connected in series across the junction points of the serially connected resistor and diode in the pair of circuit arms.

3. Apparatus according to claim 1, wherein said voltage comparator comprises a differential amplifier having the two inputs thereof connected to the junction points of the serially connected resistor and diode in the pair of circuit arms; and a voltmeter connected between the output of the amplifier and ground.

4. Apparatus according to claim 1, wherein said first and second voltage dividing chains are each composed of a pair of serially connected resistors.

* * * * *